March 13, 1951         J. F. DREYER       2,544,659
DICHROIC LIGHT-POLARIZING SHEET MATERIALS AND
THE LIKE AND THE FORMATION AND USE THEREOF
Filed May 14, 1946

INVENTOR
JOHN F. DREYER
BY
Blair, Curtis + Hayward
ATTORNEYS

UNITED STATES PATENT OFFICE 2,544,659

DICHROIC LIGHT-POLARIZING SHEET MATERIALS AND THE LIKE AND THE FORMATION AND USE THEREOF

John F. Dreyer, Springfield, Ohio, assignor, by mesne assignments, to John F. Dreyer, doing business as Dreyer Laboratories, Cincinnati, Ohio Application May 14, 1946, Serial No. 669,698

12 Claims. (Cl. 88—65)

This invention relates to dichroic (including pleochroic) materials having oriented molecular arrangment adapted for polarizing light and to materials readily convertible thereinto; and also to products and devices comprising such materials and to methods for the formation thereof.

This application is a continuation-in-part of my copending application Serial No. 384,550, now Patent No. 2,400,877, dated May 28, 1946, filed March 21, 1941, as a continuation-in-part of my applications Serial Nos. 217,249 and 263,779, filed July 2, 1938 and March 23, 1939 respectively, now abandoned.

As set forth in my said Patent No. 2,400,877, I have found that excellent results are obtained by the use of materials which exhibit the nematic state or phase—a mesomorphic state of matter occurring between the liquid state and the solid state with certain molecular types of substances. Such materials can, therefore, be readily oriented in situ to give a light polarizing film. Certain dyes, for instance, provide excellent polarizing materials when thus oriented in the nematic state. Such dyes, for example, may be applied as a film of solution to an anisotropic surface and brought into the nematic state—with the result that the molecules in the applied film, as they spontaneously assume parallelism, readily and uniformly assume an orientation conforming to the surface anisotropy. By rapid but quiet evaporation of the solvent, this spontaneous orientation of the film is fixed and preserved. By "quiet" I mean without ebullition or other disturbance in the liquid which would interfere with the molecular orientation.

Since most such dyes have various color hues however, their usefulness was at first limited to those purposes, such for example as eye-glasses designed for glare-elimination, color photography and television, dial indicators, strain gauges, etc., where tinted polarizing films are sometimes desired or in which the hue of the film is non-essential. Even in the former case, the particular dye which gives a more desirable color may be less satisfactory for use as a polarizer, or the dye which gives a more satisfactory polarizing effect or which is more readily polarized may be one with a less pleasing hue.

With a view to overcoming the foregoing and other difficulties, I have found that dichroic dyes of different character, especially of different color, can be brought conjointly into the nematic state and thus not only give a highly satisfactory polarizing effect but also a combined color effect which is highly advantageous. By such combinations one may produce at will any desired spectral distribution whether a bright hue or a neutral gray. The substances thus combined, however, are selected for similarity of molecular form such that they readily pack in parallelism with freedom of movement parallel to and about their long axes; and thus can come conjointly into the nematic state. This is appropriately described in chemical terminology as steric similarity and the molecules as sterically similar. Extraneous material is to be avoided if of such nature as to interfere with this parallelism and freedom of movement retaining such parallelism or if of such crystalline nature as to oppose its crystal anisotropy to the anisotropy relied upon for orientation of the nematic material.

Prior to the present invention such orientation had been observed in pure solutions and fusions, but the formation of the nematic state was known to be critical and presence of impurities could prevent its occurrence, it was not expected that mixtures of dyes could be used.

It is possible, by orienting different dye molecules in optically subtractive relation, i. e., so that the same light rays are acted upon by both dyes within the film, to so combine dyes of different color as to produce not only a desired tinting of the light, or neutral gray with substantially no tinting, but also an increased polarizing efficiency. Where high polarizing efficiency is not required I have found also that desired color or absence of color may be obtained by films of mixed dyes in which the dye molecules are in optically additive, i. e., side-by-side, relation.

In some instances moreover a combination of dyes is more advantageous even from the standpoint of orientation than a single dye. There are some mixtures which polarize more completely than any of the individual components due to the fact that the molecules of the dichroic substances aid each other in coming into parallelism because of the complementary or other shapes or sizes of the molecules, and there are some mixtures which may be applied more readily than a single dye.

It is well recognized in the literature that there are many materials, including dyes, which can pass through the nematic state during the process of solidification or fusion or in the process of passing from dissolved to solid form or from solid to dissolved. Such materials are referred to as nematic materials whether or not they are in the nematic state. When in the nematic state the molecules (or molecular units) of a substance have their axes parallel but are otherwise arranged quite irregularly and are free to move at random, and with wholly random locations. When a material is brought from the ordinary liquid state in to a nematic state under normal conditions the molecules thereof tend to aline themselves in parallelism but if no orienting influence is present there will be no unity of alignment but instead swarms each extending over a small area and with the molecules in the area parallel to each other but in random orientation with other swarm areas. If, however, they are subjected to an orienting influence the molecules will very readily come into parallelism throughout the substance in the single direction or in accordance with the predetermined pattern of the anisotropy of the orienting influence. Consequently, there is provided a molecular alignment which can be maintained as the substance is solidified, in accordance with the invention of my said prior patent, so as to provide a permanent orientation excellently adapted for polarizing light. The nematic state accordingly lends itself excellently to such an orientation step.

I have found for example that because of the inherently assured parallelism of molecules of a substance when in the nematic state only a very weak field is required to establish complete and uniform orientation throughout the film or other mass of substance, and for the same reason a very high proportion of the molecules will be fully oriented to the pre-determined pattern. Precautions should be taken if this orientation is to be preserved intact in a solid film since normally the change from the nematic state to the solid state is attended by disappearance of the parallelism. This dis-orientation may be due to a re-orientation of the molecules or to physical disturbance, e. g., due to ebullition upon too rapid removal of the solvent. At any rate, I have found that if the orientation is to be maintained the solvent should preferably be removed by diffusion evaporation, or other mild treatment carried out as rapidly as possible without destroying the mild character of such treatment. Ebullition on the one hand and crystallization on the other are to be particularly avoided. If the former occurs, the drying is too rapid; if crystallization appears, solidification is too slow, or crystal impurities or other crystallizing influences may be present which should be removed.

The phenomenon of spontaneous orientation in the nematic state had been studied scientifically before my present invention and is further discussed in my said prior patent. It is known that the direction of such orientation can be established by electric or magnetic fields, as well as by crystal surfaces although as a practical matter it is ordinarily much better to utilize the orienting effect of rubbed solid surfaces.

The chemistry of compounds which may be brought to the nematic state has been studied and discussed in the literature; see, inter alia, Vorlander "Chemische Kristallographie die Flüssigkeiten," Leipzig (1924). They are often long-chain polar molecules without heavy side chains. Among materials which have such structure are included particularly many of the "para" substituted aromatic carbon compounds and especially flat molecules, e. g. having several carbocyclic or heterocyclic rings in the same plane. The molecule should not be too long as it may then be cumbersome so as to delay excessively its orientation or to be kept from full orientation by entanglement with other molecules. If, on the other hand, the molecule is too short, it may be so readily orientable as to crystallize, i. e., re-orient into crystal lattices, even with rapid drying which would avoid such re-orientation with longer molecules. As indicated, the effect of polar groups is also important, apparently being the mechanism by which the molecules are made responsive to the orienting field.

In the accompanying drawings I have illustrated diagrammatically a polarizing plate and the arrangement of molecules. In these drawings.

As one example, a mixture which has given excellent results with good polarization efficiency and substantially neutral color, is an aqueous solution of Resorcin Brown (Color Index No. 234; or Resorcin Brown, Color Index No. 235) with Benzo Fast Blue 4GL (Color Index No. 533) in 3% solution with equal proportions of these dyes by weight. More or less of the Resorcin Brown gives more of a greenish or more of a blueish hue, as desired.

Figure 3:
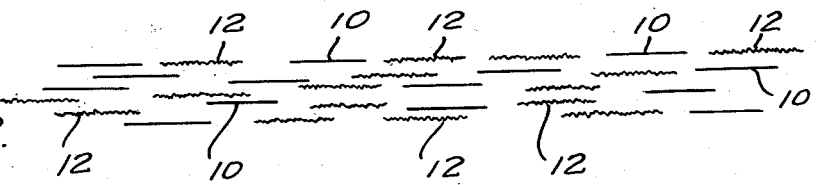
Figure 3 represents a mixture of different dyes with the molecules of all oriented in substantial parallelism.

The arrangement of molecules in the polarizing film including such mixtures of dyes is represented diagrammatically in Figure 3 wherein the molecules of one dye are represented by straight lines indicated for example by the reference character 10 and molecules of another dye represented by waved lines indicated by the reference character 12. As indicated these molecules occur at random locations, but in any substantial area and in a substantial thickness of the film, molecules of the different dyes occur in optically subtractive relation thus giving the desired color with good polarizing efficiency.

Another highly satisfactory mixture is a 4% aqueous solution of 15 parts by weight of Benzo Fast Yellow 5GL (Color Index No. 346), 15 parts by weight of Benzo Fast Blue 4GL and 60 parts by weight of Sulfon Cyanine 5R Ex (Color Index No. 289). This also gives a gray with good polarization efficiency.

Good results are obtained with a 1½% aqueous solution of substantially equal parts of Chloramine Yellow (Color Index No. 814) and Benzo Fast Blue FR (Color Index No. 533). Ample quantities of water should be used with Chloramine Yellow and other difficultly-soluble dyes so as to be sure that the entire amount thereof gets into solution, since otherwise the undissolved solid dye particles never go into the nematic state, and interfere with the full orientation.

Water-resistance may be imparted to the final product by treatment with aluminum chloride, which serves also to increase the light and heat resistance of the film. Treatment with this material should be avoided, or used with caution, in instances where any of the dyes used is soluble therein.

A methanol solution of Acridine Orange NO, Resin Violet R (National Aniline & Chemical Co. Inc.) and zinc-free Methylene Blue (Color Index No. 922) gives a highly polarized film which, if a little on the brown side is highly desirable for glare-resistant eye-glasses. The mixture is desirably treated with zinc chloride.

Benzo Fast Blue FR with Benzo Fast Yellow 5GL gives a good gray; Chloramine Yellow and Benzo Fast Blue 4GL yield a good polarizing green; Chloramine Yellow, Benzo Fast Blue 4GL and Benzo Fast Heliotrope (Color Index No. 319) provide a neutral gray; and Orange R (Color Index No. 161) and Benzo Fast Blue 4GL combine to a good polarizing brown. Other good mixtures are Benzo Fast Blue 4GL with Milling Orange (Color Index No. 274); Fast Red E (Color Index No. 182) with Amaranth (Color Index No. 184); Safranine (Color Index No. 841) with Methylene Blue; Amaranth with Naphthol Yellow S (Color Index No. 10) and diethanol amine; Methylene Blue with Brilliant Crocein M (Color Index No. 252); and Zapon Fast Blue HL with Calcozine Red BN Extra. Zapon Fast Blue HL can be mixed with Neutral Red (Color Index No. 825) to give a stronger absorption of light than either gives alone. An example of a mixture with excellent orienting properties wherein a weakly orienting material is aided in effecting its orientation by a material having high orienting properties is a mixture of Resin Violet B with Methylene Blue, the latter aiding the former in its orienting properties.

There are also instances wherein satisfactory color effects can be produced, due to salt formation, from materials which would not normally give such color effects. For example, Benzo Fast Heliotrope and Naphthol Yellow S give a purple in solution but dry to a green. It is important, however, that no two materials be used together which are reactive to produce a precipitate unless the precipitate is removed and the remaining substances are dichroic and give the desired color. If any substantial amount of precipitate is present in the liquid film it tends to interfere with the complete orientation of dye molecules to the anisotropic pattern when the film is dried.

The optimum in film thickness is obtained with many dyes with about 4½% concentration in true solution.

Care should be taken to avoid impurities which interfere with the ability of the dyes to go into the nematic state or to retain orientation on drying. For instance pure distilled water should be used with dyes such as Diamond Black F (Color Index No. 299) which is quite sensitive to hard water salts. Other dyes are sensitive to compounds formed in water when used in iron, zinc, or copper containers. Glass mixing containers should generally be used to avoid the latter difficulties. Pre-treatment of the water is often desirable. For example sodium oleate may be added to precipitate magnesium and other salts; and ion-exchange resins may be added to de-ionize the water.

Common salt in substantial amount (e. g. as much as 1%) should not be present when water or other liquid which dissolves it is the solvent since it causes molecular aggregations. Other salts, for instance sodium acetate, have similar tendencies. Meta compounds which occur as impurities in para dyes are generally undesirable. Insoluble or undissolved crystals, whether carried into the mixture or formed therein, are generally harmful. Salting out tendencies may be avoided by depressants therefor.

Impurities from other sources such, for instance, as organisms should likewise be avoided. For example, water solutions of dyes sometimes collect fungi when standing. These fungi themselves or precipitates caused by their presence may interfere markedly with the obtaining of orientation from the nematic state while subject to an orienting influence. A fungicide such for instance as resorcinol, cetyl pyridinium chloride (Patent No. 2,295,505) or sodium lorol sulphate (technical sodium lauryl sulphate) may be used in the mix to control this difficulty.

Impurities from the air such as camphor vapors may give rise to difficulties in causing the dye to crawl away from the glass or other surface on which it is desired to spread it. Similar difficulties occur due to the presence of benzol, ethyl acetate, etc., as denaturing agents in ethyl alcohol. Certain dyestuffs have poor wetting properties, particularly on glass even when free from impurities, moreover. Pursuant to the invention, a nonreactive wetting agent such, for example, the common sulfonated bicarboxy acid ester type wetting agents, such as Aerosol or the sulfates of the higher secondary alcohols, such as Turgitol may be used to counteract or to eliminate these difficulties, insofar as they cannot be avoided by elimination of the offending impurities, denaturants, etc., or use of dyes and base more compatible for wetting properties.

In selecting dyes for conjoint use in accordance with the invention, combinations of dyes of the same general chemical character are preferred. Two or more acid dyes or two or more basic dyes should in general be used, rather than an acid-basic mix particularly if the dyes are strongly salt forming. If, however, the reaction product is a satisfactory dye of the type specified above, its use is not precluded merely because it is formed by reaction in situ. It is also important to the use of a mixed dye film that the dyes be soluble in the same solvent. The light permanence of the dyes also should be similar so that fading will not cause serious change of hue.

It is important in films embodying my invention to have the several dyes in optically subtractive relation, i. e., so that the same light passes through first one dye and then another and the several dyes are not merely side by side in adjacent positions.

The present invention also contemplates the production and use of films wherein several dyes are put on as separate layers, with or without intermediate treatment to prevent any undesired solution of the first layer when the second layer is applied.

Figure 1:
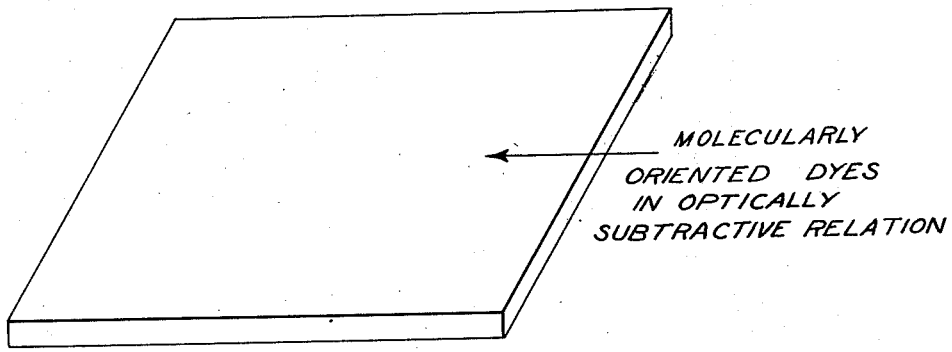
Figure 1 is a schematic view of a transparent plate coated with light polarizing dyes in optically subtractive relation.
Figure 2:
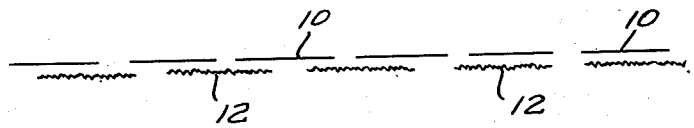
Figure 2 represents diagrammatically superposed layers of different dyes each with its molecules oriented on substantial parallel axes.

This arrangement of successive layers is indicated diagrammatically in Figure 2 wherein the molecules of one dye are represented by straight lines indicated by the reference charatcer 10 and molecules of a different dye represented by waved lines indicated by reference character 12.

By the use of different polarizable dyes in subtractive relation, the dichroism or polarizing effect of each can be substantially enhanced, and the colors can be combined to produce a neutral gray or other desired color or colors in polarized and unpolarized light. If superposed layers of the respective dyes are used the last color applied will largely determine the appearance by reflected light and this may alter the apparent color of the film. When mixed dye films are used an additive color effect is produced in reflected light notwithstanding the subtractive effect by transmitted light.

Although I prefer ordinarily to use dyes all of which polarize light, I can also use a polarizing dye in combination with a non-polarizing dye to correct its color either in polarized or unpolarized light, and thus to give a different color in polarized light than in ordinary light; or when viewed through an analyzer to given different colors when viewed with different angular orientation.

Dyes which combine chemically or by molecular association (through coordinate bonds) if used in mixtures can be applied as successive layers without such reaction; or in some cases one such layer may be modified by chemical reaction with an adjacent separately applied layer. For example a Zapon Fast Blue HL film applied to a rubbed glass surface and dried can be "topped" by dipping into a water solution of Methylene Green B (Color Index No. 924), Neutral Red or Resin Violet B. In certain instances, as for example with Zapon Fast Blue HL and Neutral Red the resulting film is much of the nature of a mixture although applied as separate layers, and in this case there is also some evidence of chemical reaction. As another example, a Napthol Yellow S oriented film may be dipped in a twenty per cent solution of Toluidine Blue (Color Index No. 925) in water. Methylene Blue may be topped with Naphthol Yellow S. The excess dye which has not combined may be washed off or dried in situ, and it will be found that the dichroism is increased by the second or "topping" dye and the desired color modification obtained. This effect is improved by driving water of hydration from the first film (e. g. by heating in an oven at 100° C.), before applying the second dye.

When it is desired to combine dyes, which from orienting, polarizing, and color standpoints, are highly desirable for conjoint use but which would be deteriorated by interaction in the presence of a common solvent, the invention contemplates the provision of one layer on another under conditions such that the underlying layer is not dissolved or subjected to reactive conditions. For example, an acid dye may be first applied, oriented, and solidified, and then a layer of basic dye may be applied under conditions such that it will not enter into combination with the acid dye. If desired, the dye first applied, in this case the acid dye, may be rendered non-reactive before the application of the other dye; or it may be coated with a protective film; or the second dye may be applied in a solution which does not dissolve the first.

The first dye may be rendered insoluble before the application of the second dye, e. g., by the treatment of such dyes as Chloramine Yellow, Benzo Fast Blue FR, etc., with aluminum chloride. Thus a film of Benzo Fast Blue FR may be dipped in a solution of aluminum chloride and then treated with Chloramine Yellow. On an oriented film of Methylene Blue which has been made water resistant by washing with potassium bichromate and acid, a second film of Neutral Red may be applied from a water solution and oriented on the first film.

Other variations will suggest themselves. Topping with a second material which will combine chemically is an additional method. For example, a Zapon Fast Green HL oriented film is dipped into a twenty percent solution of Toluidine Blue in water and dried as above described. The whole is then washed with water. It will be found that some of the second dye is held by the first dye and is not removed by the subsequent washing, and that the dichroism is increased. The heavier the first film the more will be the increase in dichroism. If the water of hydration is removed from the first dye as by heating in an oven at 100° centigrade it will be found that a greater increase of dichroism will occur when the combination with the second dye takes place.

Where it is feasible to do so, it is of course simplest to select dyes which are non-reactive with one another and apply them as first above indicated. Or one dye can be applied to one side of a transparent sheet and a second similarly oriented can be applied to the opposite side.

In general both (or all) of the dyes should have the same axes of polarization and absorption, but in certain instances, as where it is desirable to broaden the extinction angle, their axes may be differently oriented. Such a condition exists when Zapon Fast Blue HL is topped by Neutral Red.

Solvents suited to the particular dyes and particular problems are used. Beyond the considerations already mentioned, a solvent, if used, should be one which in the solution will readily wet without dissolving the surface on which the polarizing material is to be formed, it should not adversely affect the orienting field—particularly it should not corrode the rubbed or otherwise oriented surface nor itself form crystals nor crystallize any other ingredient of the solution under conditions of drying and advantageously should not be hygroscopic if used in an atmosphere containing moisture; it should dissolve the polarizable material in sufficient degree to disperse the molecules to produce substantial films or other bodies, and it should be sufficiently volatile to be rapidly evaporated at reasonable temperatures which will not adversely affect the various materials used. Solvents which I have used satisfactorily include methanol, water, acetone, ethyl alcohol, ethylene glycol, glycerine, acetone, pyridine and certain mixtures of these. The choice will, of course, depend upon the particular material to be dissolved, bearing in mind the considerations stated herein. In general, excellent results have been obtained with methanol, which readily dissolves most dyes, wets most surfaces and tends to concentrate at the exposed surface of the dye solution, is highly volatile, and non-hygroscopic.

The film of the polarizing material may be applied, whether in solution or as a fused liquid, by any of the usual means and methods, e. g., by spraying, flowing, pouring or brushing onto the surface. Or it may be applied as comminuted solid or a film which is fused on said surface after application. An excess of the material may be applied and the excess allowed to drain off by gravity or be driven off by centrifugal force or taken up by brushing, etc. It should be borne in mind, however, that brushing, rubbing or flow, particularly while the material is in the nematic state, may exert an orienting influence; and, where possible, it should be avoided or performed so that this influence coincides with the desired orientation. So long as the liquid is in the amorphous, isotropic condition, however, any orienting influence of flow is slight and does not seriously disturb an orienting field such as that which may have been produced by rubbing the underlying surface.

The film may best be applied by dipping the surface into a body of liquid and slowly removing so that the running back of the excess is essentially constant. Although it is desirable that the thickness should be uniform, the thickness which is required is not critical. For example, with a given solution and using the dipping method, speeds of removal of from one to ten inches per minute may be used in different cases, and in each case a satisfactory product will be obtained although, of course, the product formed with the faster speed will have the thicker film. The films thus produced, although fluid, adhere to the glass and essentially remain in place.

Uniformity of drying may be accomplished in various ways already known in the art of drying films. One method which I have found particularly satisfactory is to keep the film wet until all parts are coated, then uniformly to change the condition of the atmosphere about the coated part, e. g., by coating in an atmosphere saturated with vapor of the solvent used and then moving uniformly into a dry atmosphere or through progressively drier atmospheres after the entire film has been deposited.

The field effect by which the orientation is secured will ordinarily be a result of an orientation of the surface on which polarizable material is deposited, but it may be created or enhanced by external means, e. g., a static electrical or magnetic field. Field magnitudes of the order of 200–10,000 gausses or more and 200–15,000 v./cm. or more may be used for orienting dipole materials (Faraday and Kerr effects), but this is unnecessarily complicated. I have found that the best results are obtained, and with extreme simplicity in manufacturing technique, by merely rubbing the surface on which the film is to be deposited before the deposition occurs, or in the case of flexible base, such as cellulosic film, by stretching. The resulting field effect may be due to Van der Walls forces, or it may be due to the physical contour of the molecules at the surface, which in turn exert an orienting field upon the molecules in the applied film. Whatever may be the explanation, I have found that strong brushing, rubbing, or stretching of the supporting surface in one direction, or any other treatment which effects surface an isotropy of the support will result in a definite orientation of the polarizable materials applied to the treated surface; and I have referred to such a surface as "oriented."

Leather, silk, cotton, paper, rubber, metal or other material may be used for this rubbing treatment. This material as well as the surface rubbed, should advantageously be dry and chemically inert, as ordinarily considered, with respect to one another. The surface to which the film is to be applied will ordinarily be thoroughly cleaned in order to get good adhesion of the polarizing film and to obtain the uniform drying and uniformity of the dried film. This should be adopted, for example, in the case of Methylene Blue on glass, but such cleaning is not ordinarily necessary, and some materials which have a lesser affinity for glass may give better results if the glass is covered with a thin film of some other material, such as glycerine. Foreign films may be applied to improve adhesion of the film, to give a better orienting surface than the base alone or to facilitate stripping films from the support, as more fully described and claimed in my copending application Serial No. 669,699, filed May 14, 1946, now Patent 2,524,286, issued October 3, 1950.

The cleansing, if desired, can be done by scrubbing, advantageously with mild abrasives, for instance rouge; chemical cleaning agents, e. g., a strong soap solution or other detergent; a strong acid, e. g., nitric acid; an alkali, e. g., tri-sodium phosphate; or an oxidizing agent, e. g., potassium bichromate plus sulfuric acid. Technically this cleaning should take place before the rubbing treatment inasmuch as the rubbing during cleaning or drying, or even the chemicals used for cleaning, might affect the orientation.

The base material which is subjected to this treatment may be any of a wide variety of materials, especially an amorphous material such as glass, cellulosic film or resin. Crystalline materials, e. g., such as mica, may be used without rubbing if the orientation is sufficiently strong and uniform, but may advantageously be treated by rubbing in a direction to give an orientation coincident with the natural orientation of molecules in the crystal. The base should not be soluble in any solvent used in forming the film and it should not have any strong orientation or field effect opposed to that which is desired in the surface film. Since the dried film is intended for optical purposes, the base should ordinarily be one which transmits light and should have a plane, curved or other desired optical form and reflect light.

In my copending application filed herewith, Serial No. 669,699, filed May 14, 1946, I have described the making and use of transferable oriented dichroic films. Instead of directly applying the polarizing materials to and orienting on the support, I may also form separate films of the various dyes, etc., and apply them one over the other on one side of, or on opposite sides of, a suitable support.

I claim:

1. The method of producing polarizing material which comprises bringing into a common liquid phase a plurality of dichroic nematic materials, bringing said materials conjointly into the nematic phase while subjecting the molecules of the materials to an orienting influence and thereafter subjecting them to a mild but rapid solidifying influence to cause said materials to be solidified in their resulting oriented condition.

2. The method of producing a polarizing material which comprises applying to a surface a thin film of a solution of a dye the molecules of which have long axes, said dye being capable of passing thru the nematic phase and when molecularly-oriented of polarizing light, passing said dye thru the nematic phase while subject to molecular-orienting forces so that the molecules of said dye will have their long axes oriented in parallelism with adjacent molecules, solidifying said film without disturbing the orientation of said molecules with its molecules oriented in parallelism, rendering the film resistant to a dye solution having similar characteristics, applying such dye solution to the film, and similarly orienting and depositing said last-mentioned dye from said solution.

3. The method of producing a polarizing material as set forth in claim 2 which comprises forming the first-mentioned solid film of water soluble dichroic dye with its molecules in parallel orientation, rendering the dye water resistant, applying an aqueous solution of water-soluble dye as said last-mentioned dye to the film, orienting its molecules with respect to the first named film, and hardening the second-mentioned dye.

4. The method of providing a polarizing material as set forth in claim 2 which comprises forming the first-mentioned solid film of water soluble dichroic dye with its molecules in parallel orientation, treating with aluminum chloride, applying an aqueous solution of water-soluble dye as said last-mentioned dye to the film, bringing said solution into the nematic phase and hardening the second-mentioned dye.

5. The method of producing a polarizing material as set forth in claim 2 which comprises forming the first-mentioned solid film of water soluble dichroic dye with its molecules in parallel orientation, rendering the dye water resistant, applying an aqueous solution of the same water-soluble dye as said last-mentioned dye to the film, bringing the solution into the nematic phase and hardening the second-mentioned dye.

6. As a polarizing medium a thin dye film composed essentially of a plurality of polarizing dyes the molecules of which have long axes and are capable of passing thru the nematic phase, said thin film being formed by spreading the dyes in thin liquid form and bringing them into the solid state by passing them thru the nematic phase while subject to molecular-orienting forces while in the nematic phase so that the molecules of the dyes in the solidified films will have their long axes oriented in parallelism with the long axes of adjacent molecules, the molecules of each of said dyes having their long axes oriented in general parallelism to the long axes of any adjacent molecules of the other thereof.

7. As a polarizing medium a thin dye film as set forth in claim 6 wherein said dyes have complementary spectral distribution of both polarized and unpolarized light whereby colors viewed thru said film appear in approximately the same hues as when viewed directly.

8. As a polarizing medium a dye film as defined in claim 6 in which the molecules of the different dyes are commingled in a common layer whereby they come conjointly to nematic phase in a common liquid film.

9. As a polarizing medium a dye film as defined in claim 6 in which the molecules of each dye are in a separate layer distinct from that of the other dye, said layers being superposed contiguous and substantially integrally combined in said film.

10. A polarizing device comprising a supporting base having a surface the molecules of which are oriented in parallelism, and a thin dye film on said surface composed essentially of a plurality of polarizing dyes the molecules of which have long axes and are capable of passing thru the nematic phase, and which have been brought into solid form by being spread in thin liquid film form on said surface and being passed thru the nematic phase while subject, while in the nematic phase, to the orienting influence of juxtaposed molecules so that the molecules of the dyes in the solidified films will have their long axes oriented in parallelism with the long axes of adjacent molecules, the molecules of each of said dyes having their long axes oriented in general parallelism to the long axes of any adjacent molecules of the other thereof.

11. A polarizing device as set forth in claim 10, wherein the dye molecules, while all oriented each with one dimension in approximate parallelism to adjacent molecules are in random space arrangement as to direction from center to center of adjacent molecules.

12. A method as set forth in claim 1 wherein said dyes are of such color and in such amounts in their respective films as to give in the aggregate a neutral gray effect.

JOHN F. DREYER.

REFERENCES CITED

The following references are of record in the file of this patent:

UNITED STATES PATENTS

| Number | Name | Date |
|---|---|---|
| 194,754 | Wolff | Aug. 28, 1877 |
| 1,341,637 | Fries | June 1, 1920 |
| 1,873,951 | Zocher | Aug. 30, 1932 |
| 2,062,179 | Hunter | Nov. 24, 1936 |
| 2,199,227 | Marks | Apr. 30, 1940 |
| 2,236,972 | Kasemann | Apr. 1, 1941 |
| 2,237,567 | Land | Apr. 8, 1941 |
| 2,346,766 | Land | Apr. 18, 1944 |
| 2,400,877 | Dreyer | May 28, 1946 |
| 2,418,605 | Sheppard | Apr. 8, 1947 |
| 2,454,515 | Land | Nov. 23, 1948 |

OTHER REFERENCES

Tutton: Text Crystallography and Practical Crystal Measurements, volume 2, pages 1406 to 1408, MacMillan Company, New York.